April 16, 1940.   B. W. AMMANN ET AL   2,197,117
WINDING MACHINE
Filed March 31, 1938   11 Sheets-Sheet 3

INVENTORS
B. W. AMMANN
O. L. BACHMANN
BY
ATTORNEY.

April 16, 1940.   B. W. AMMANN ET AL   2,197,117
WINDING MACHINE
Filed March 31, 1938    11 Sheets-Sheet 7

FIG. 22.

INVENTORS
B. W. AMMANN
O. L. BACHMANN
BY
ATTORNEY.

Patented Apr. 16, 1940

2,197,117

UNITED STATES PATENT OFFICE 2,197,117

WINDING MACHINE

Bernard W. Ammann and Otto L. Bachmann, St. Louis, Mo., assignors to Wagner Electric Corporation, St. Louis, Mo., a corporation of Delaware Application March 31, 1938, Serial No. 199,142

16 Claims. (Cl. 242—1)

Our invention relates to a winding machine and more particularly to a machine for applying coils to the stator of a motor or to any other annular structure requiring the application of coils to slots formed in the inner face thereof. In the form shown it is designed to apply the coils to a four pole stator, each pole of which is produced by four coils separated by the teeth between the slots. In our machine the stator is carried in an oscillating chuck, the wire being threaded through the stator by a shuttle carrying a plurality of strands so that the coils of at least two poles are simultaneously wound.

One object of our invention is to provide improved means for imparting the oscillatory motion to the chuck and for automatically controlling the amount of movement thereof to cause the successive coils to embrace the proper number of teeth.

Another object of our invention is to provide effective wire gripping means for engaging the strands at each end of the shuttle stroke to draw them into the slots and to form the desired loops at the ends. Such gripping means is so constructed as to effectively engage and release the wire and is so formed as to avoid injury to it either from kinking or marring the insulation. The latter result is particularly liable to occur with enameled wire if the gripping means is not properly designed.

A further object of our invention is to provide a readily variable control device by means of which the number of turns per coil is regulated, said device functioning through the chuck oscillating means which it automatically varies when the number of turns for which it is set have been applied.

Other objects of our invention are to improve various details of construction in winding machines as set forth in the following description and pointed out in the claims.

In the accompanying drawings which illustrate one form of winding machine made in accordance with our invention

The frame of the machine comprises a main housing 1, a base 2, preferably formed integral therewith, and a removable cap 3. Enclosed in the base 2 is a motor 4 for driving the machine. On one end of the driving shaft 5 is a worm 6 engaging a worm wheel 7. The worm and wheel are enclosed in a gear housing 8 secured to the under side of the main housing. Wheel 7 is carried on a vertical shaft 9 extending up into the main housing and carrying a miter gear 10 (Figure 22) meshing with a gear 11 on the driving shaft 12 of a change gear mechanism. Mounted on shaft 12 are gear wheels 13 meshing with gear wheels 14 on a counter-shaft 15. This shaft has slidingly mounted in it a control bar 16 carrying a spring-pressed dog 17 adapted to engage with recesses 18 in one or the other of the wheels 14 and so vary the relative speed of the machine to the driving motor. The bar 16 is provided with a knob 19 extending through the rear side wall of the main housing (see also Figure 4). Carried on the end of the counter-shaft is a miter gear 20 meshing with a gear 21 on the main driving shaft 22 which extends longitudinally throughout substantially the entire length of the machine. The speed changing mechanism is enclosed in a gear change box 23 carried on the rear side wall of the main housing (see Figures 1 and 23).

Figure 15:
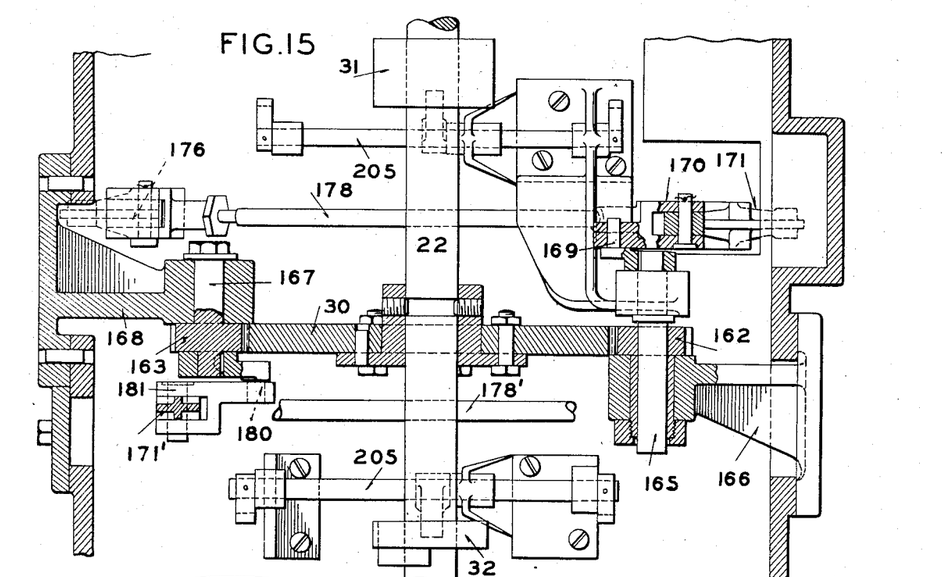
Figure 15 is a bottom plan view, partly in section, taken in the direction indicated by line 15—15 of Figure 11.
Figure 21:
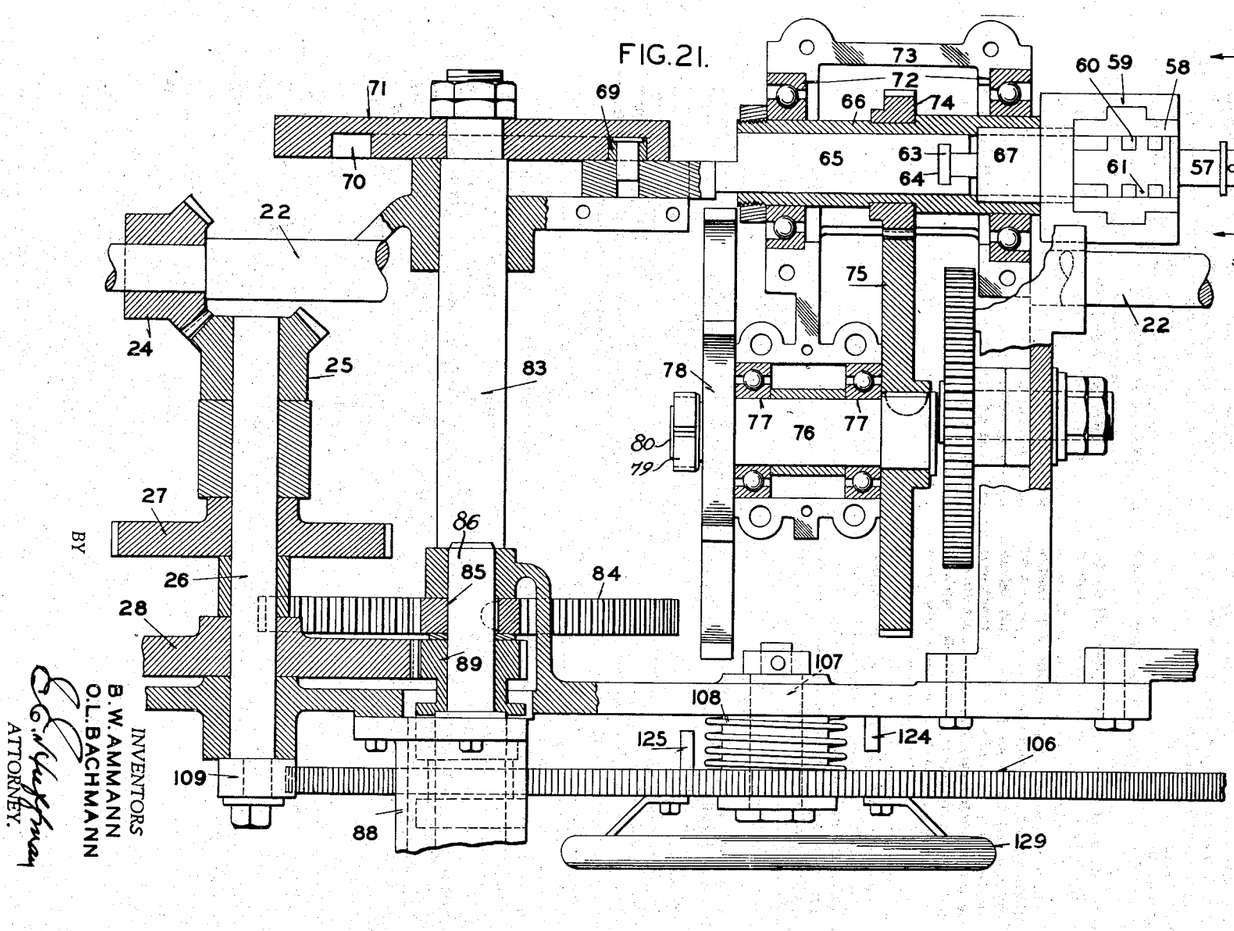
Figure 21 is a horizontal sectional view illustrating the mechanism for imparting intermittent oscillatory movement to the stator chuck and for controlling the degree of movement thereof.
Figures 32, 33, 34, 35:
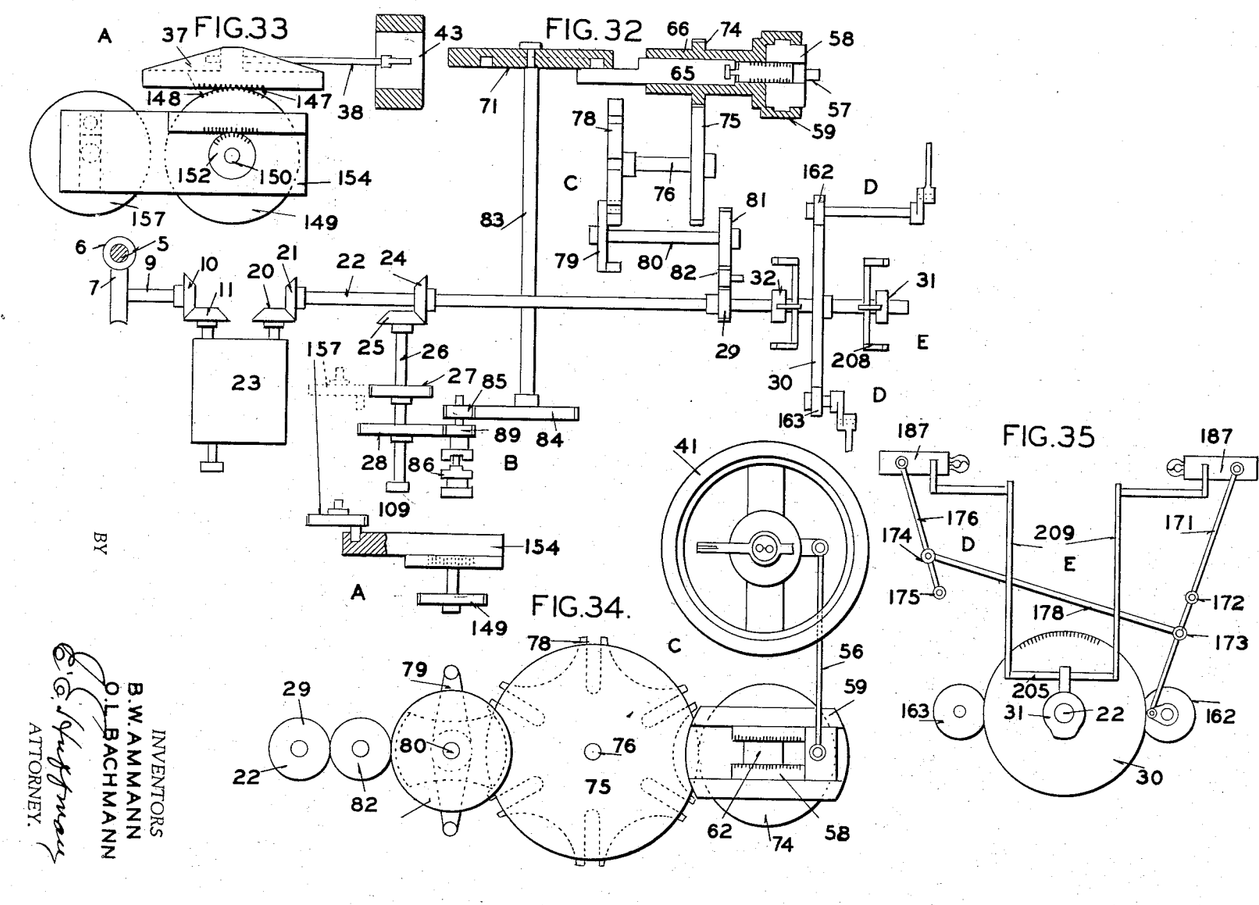
Figure 32 is a schematic plan illustrating the general operation of the machine.
Figure 33 is a schematic elevation of the shuttle operating mechanism.
Figure 34 is a schematic elevation of the chuck operation means including the device for securing variable throw of the chuck and the Geneva movement for securing a dwell at the end of the throw.
Figure 35 is a schematic elevation showing the finger slide operating connections.

Mounted on the main shaft is a bevel gear 24 meshing with a gear 25 on a cross shaft 26 (Figures 21 and 32). This shaft carries gears 27 and 28. Gear 27 actuates the slide and rack mechanism for reciprocating the shuttle. This mechanism, indicated by A in the schematic drawings, is shown in detail in Figure 23. Gear 28, acting through the clutch mechanism indicated by B and shown in detail in Figures 25 to 27, controls the degree of oscillation imparted to the chuck by the gear train C including the Geneva wheel shown in detail in Figures 12 and 21 and actuated from a spur gear 29. The main shaft also carries a mutilated gear 30 and a pair of cams 31 and 32. This gear, through lever connections indicated at D and shown in Figures 11, 15 and 28, actuates the gripping finger slides. The opening of the finger is controlled by a second set of lever connections indicated at E and shown in detail in Figures 11 and 28.

Figure 11:
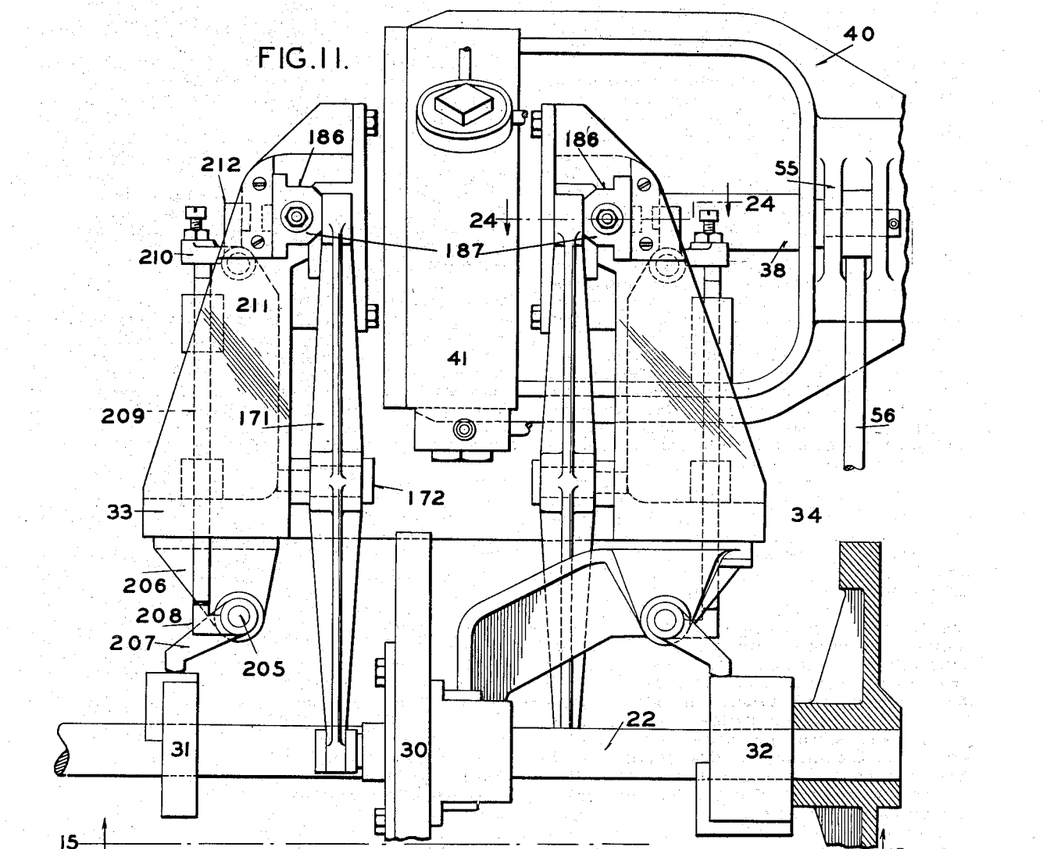
Figure 11 is a side elevation of the pedestals supporting the gripping finger mechanism and the stator chuck.
Figures 12, 13, 14:
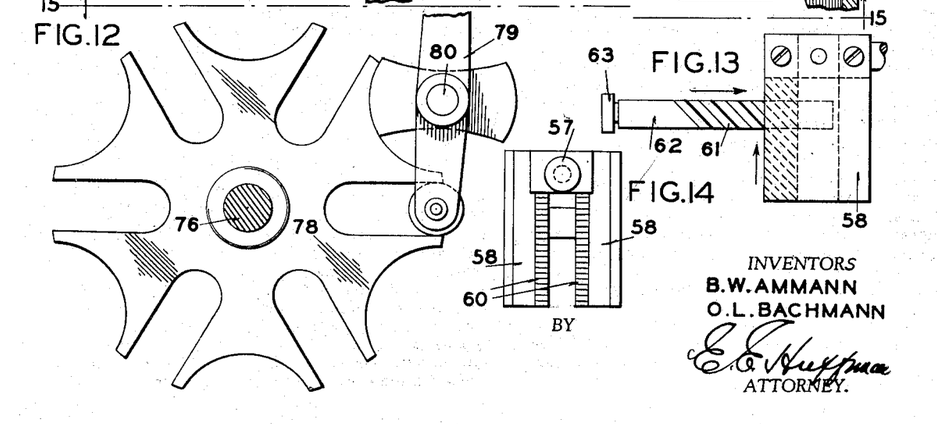
Figure 12 is a detail view of the Geneva wheel for controlling the intermittent movement of the stator chuck.
Figure 13 is a view taken in the plane indicated by the line 13—13 of Figure 5, the rack bar and block only being shown.
Figure 14 is an end view of the parts shown in Figure 13.
Figures 17, 18, 19, 20:
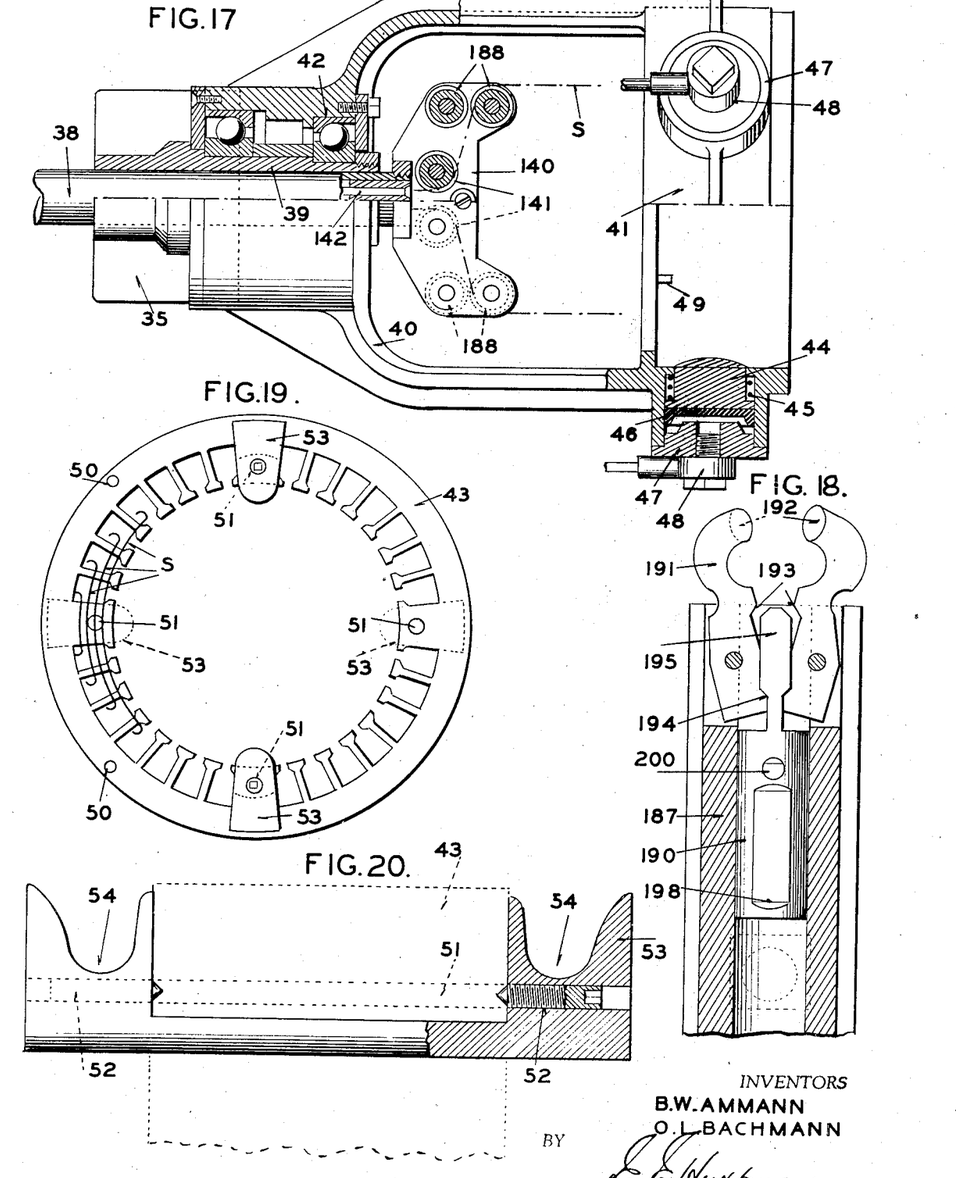
Figure 17 is a top plan view, partly in section, of the stator chuck and the wire carrying shuttle.
Figure 18 is a longitudinal section of one of the gripping finger slides, the fingers being shown in open position.
Figure 19 is an end view of a stator core showing the wire guide horns applied thereto, and diagrammatically illustrating coils applied to one pole thereof.
Figure 20 is a side view, partly in section, of one of the horns shown in Figure 19.

Mounted on the main housing are front and rear pedestals 33 and 34 and on the cap 3, a bracket 35. Formed in the top of the cap is a T-slot 36 to receive the flanges of a carriage 37. Clamped in this carriage is the rear end of the shuttle plunger 38. This plunger is tubular and its forward part slides in the bracket 35, as best shown in Figure 17. Mounted on a stud 39 carried by the bracket and forming part of the plunger guide is a U-shaped frame 40, the forward end of which provides the stator chuck 41 which is located between the pedestals, as shown in Figure 11. Ball bearings 42 are interposed between the stud and the member 40. Any desired means may be used to hold the stator 43 in the chuck. We prefer to employ air-actuated clamps, preferably three in number, one of which is shown in section in Figure 17. Each clamp comprises a piston 44 having a roughened face to contact the periphery of the stator. The piston is normally held in retracted position by a spring 45 and is provided with a packing cup 46. The end of the bore of the clamp is closed by a plug 47 carrying an air connection 48. The flow of air to and from the clamps is controlled by a suitable valve (not shown). To insure proper positioning of the stator with relation to the chuck, the stop flange of the latter is provided with a pin 49 to engage with one or the other of a pair of holes 50 in the stator near its outer edge at a distance of 90 degrees apart. The stator is also provided with four holes 51 near the face of the center tooth of each pole. These holes are engaged by the clamp pins 52 of a winding horn 53 having at each end a curved recess 54 into which the end connections of the coils are drawn.

Figures 1, 2, 3:
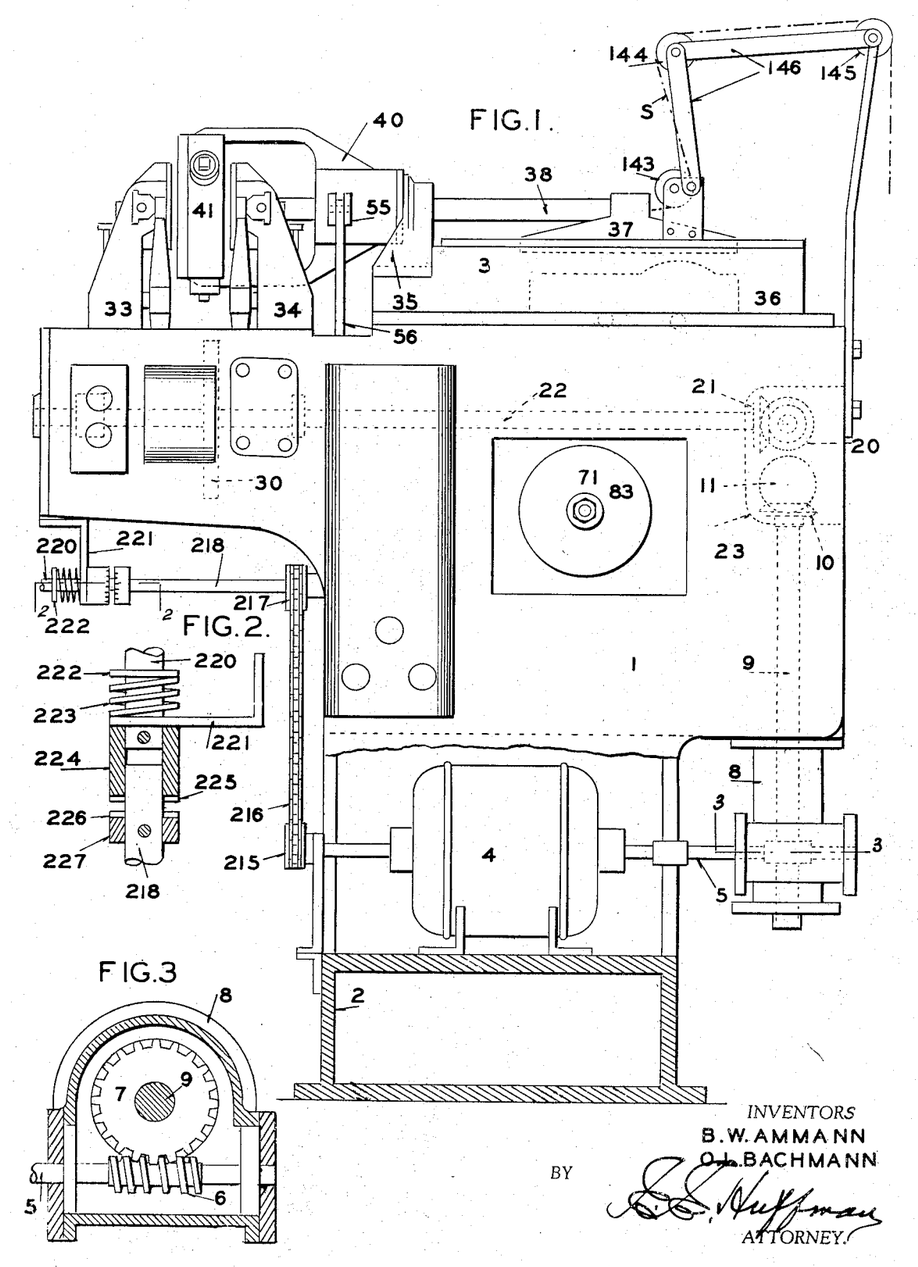
Figure 1 is a side elevation, partly in section.
Figure 2 is a section taken on the line 2—2 of Figure 1.
Figure 3 is a section taken on the line 3—3 of Figure 1.

To oscillate the stator chuck 41 its hub is provided with a pair of lugs 55 pivoted to a connecting rod 56 (Figures 1 and 11). The lower end of this rod engages a crank-pin 57 (Figures 21 and 32) carried by a bifurcated block 58 sliding in a head 59. The inner faces of this block are provided with rack teeth 60 cut at an angle of 45 degrees. These teeth mesh with similar teeth 61 formed on the edges of a rectangular bar 62 (see Figures 13 and 14). It will be seen that when the bar 62 is moved longitudinally through the block, the latter will be moved in the head to vary the distance between the axis of rotation of the head and the axis of the crank-pin and hence will vary the amount of oscillation of the stator chuck. The end of the bar 62 is provided with a head 63 engaging with a bayonet slot 64 in the end of a round bar 65. This bar slides in a sleeve 66 formed integral with or rigidly secured to the head 59. The sleeve fits snugly on and rotates around bar 65. To support the rack bar it slides through a guide block 67 positioned in the enlarged end of the sleeve bore and provided with a rectangular opening 68 snugly filling the bar. The flattened end of bar 65 is provided with a roller 69 engaging the groove 70 of a cam disk 71 which is intermittently operated as will be hereinafter described. The sleeve 66 is mounted in roller bearings 72 carried in a frame 73. Mounted on the sleeve is a gear wheel 74 by means of which it is rotated. The rotation of the sleeve will act through wrist pin 57 and connecting rod 56 to swing the stator chuck through a definite arc dependent upon the distance of the wrist pin from the center of rotation of the sleeve. When this distance is varied by longitudinal movement of bar 65, the arc will be varied so that the loop of wire will include a greater or less number of stator teeth.

Meshing with gear 74 is a gear 75 mounted on a short shaft 76 mounted in ball bearings 77 carried by the frame 73. As it is desirable that the stator chuck remain stationary for a time at each end of its arc of travel, during which time the shuttle plunger 38 passes through the stator in one or the other direction, shaft 76 has mounted on it a Geneva wheel 78. This wheel is actuated by a double-ended arm 79, shown in detail in Figure 12. This arm is mounted on a shaft 80 (Figures 21, 32 and 34) also carrying a gear wheel 81 driven from the gear 29 on the main shaft 22 through an idler 82.

Figures 4, 5, 6, 7, 8, 9, 10:
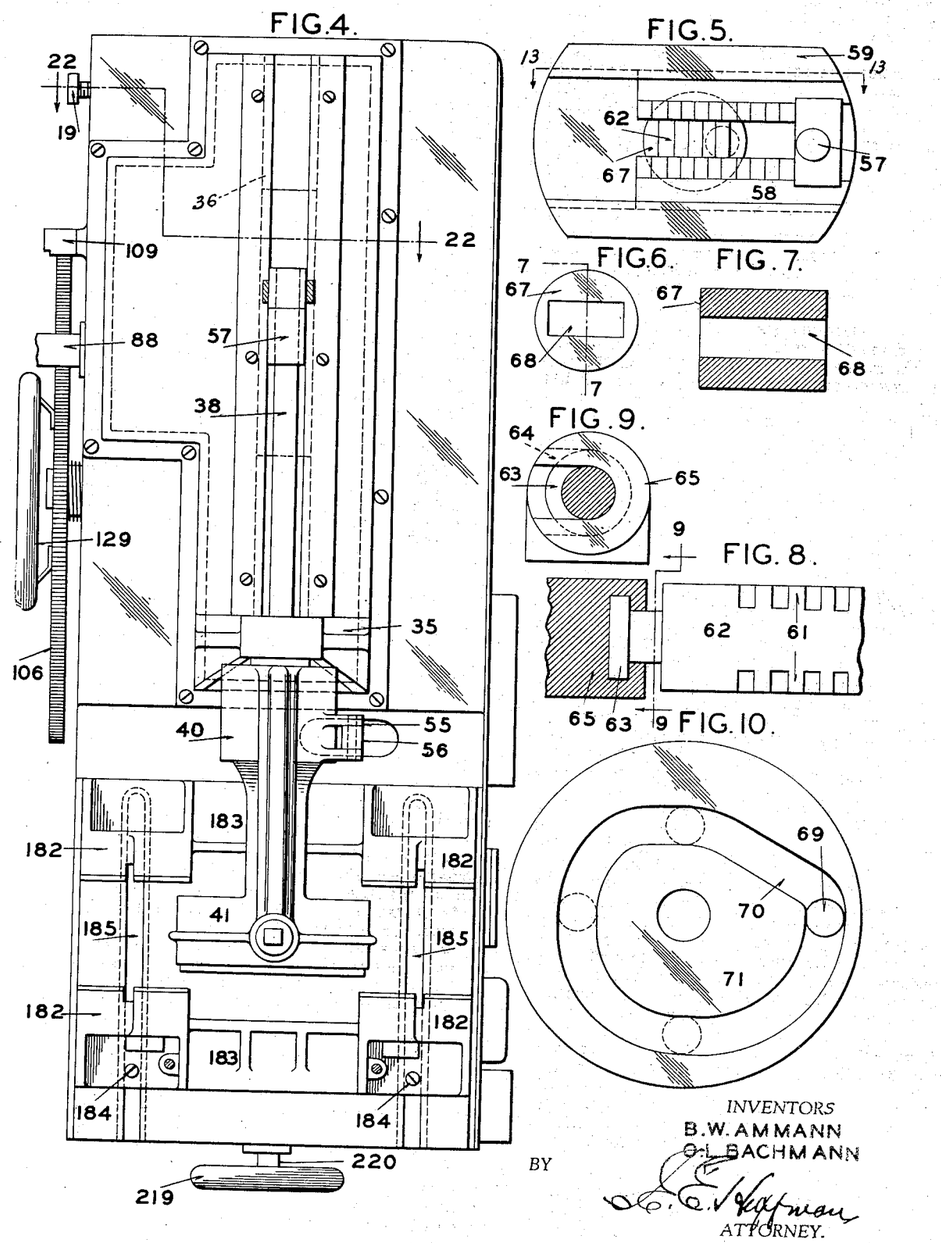
Figure 4 is a top plan view, the wire gripping fingers and their actuating parts being omitted for convenience of illustration.
Figure 5 is an end view taken in the plane indicated by line 5—5 of Figure 21 and showing the adjustable throw mechanism for varying the amount of oscillation of the stator chuck.
Figure 6 is an end view of the guide sleeve for the rack shown in Figure 5.
Figure 7 is a section taken on the line 7—7 of Figure 6.
Figure 8 is a view, partly in section, showing the rack shown in Figure 5 and its operating plunger.
Figure 9 is a section taken on the line 9—9 of Figure 8.
Figure 10 is a detail view of the cam for actuating the plunger shown in Figures 8 and 9.

The cam disk 71 (Figure 21) is mounted on a transverse shaft 83 also carrying a gear 84. Gear 84 meshes with a gear 85 forming part of the clutch mechanism shown in detail in Figures 25 to 27. The purpose of this clutch mechanism is to move cam 71 through a part only of a revolution when the winding of a coil is completed. The cam, as shown in Figure 10, has four stations or positions for winding a stator having four coils per pole. In this case the ratio between gears 84 and 85 will be four to one. It will be understood, however, that if a stator having a different number of coils per pole is to be wound, this ratio may be varied. Gear 85 is rigidly mounted on a shaft 86 journaled, preferably by means of ball bearings 87, in a cylindrical casing 88 secured to and extending through the rear wall of the main housing 1. Freely mounted on shaft 86 is a gear 89 meshing with the gear 28 on the shaft 26 and hence constantly rotated from the main shaft 22. Gear 89 carries a part 90 having end clutch teeth for engagement with end clutch teeth on a sleeve 91 sliding on shaft 86. Pinned to shaft 86 is a collar 92 having interlocking engagement with sleeve 91 by means of teeth 93 in order to permit longitudinal movement of the sleeve but to prevent relative rotary movement between it and collar and shaft. A coil spring 94 biases toward clutch-engaged position. This movement is normally prevented by means of the engagement of a pin 95 with an end cam 96 formed on the grooved portion of the sleeve. This pin is carried by a lever 97 pivoted to the housing wall. The pin is normally held in position in the groove of the sleeve by a coil spring 98 interposed between the lever and an abutment 99 on the housing wall. An adjustable stop 100 limits the movement of the lever. Pivoted to the lever 97 is a dog 101, the movement of which in one direction is limited by contact with a shoulder 102. Mounted on the same pivot as the lever 97 is a similar lever 103. The pin 104 of this lever engages with a V-shaped groove 105 in the periphery of sleeve 91. When the sleeve has made a complete rotation, the pin enters the groove to provide a check preventing over-rotation due to momentum of the parts. As this is the only purpose of this lever, it is not provided with the stop and dog.

Figures 25, 26, 27:
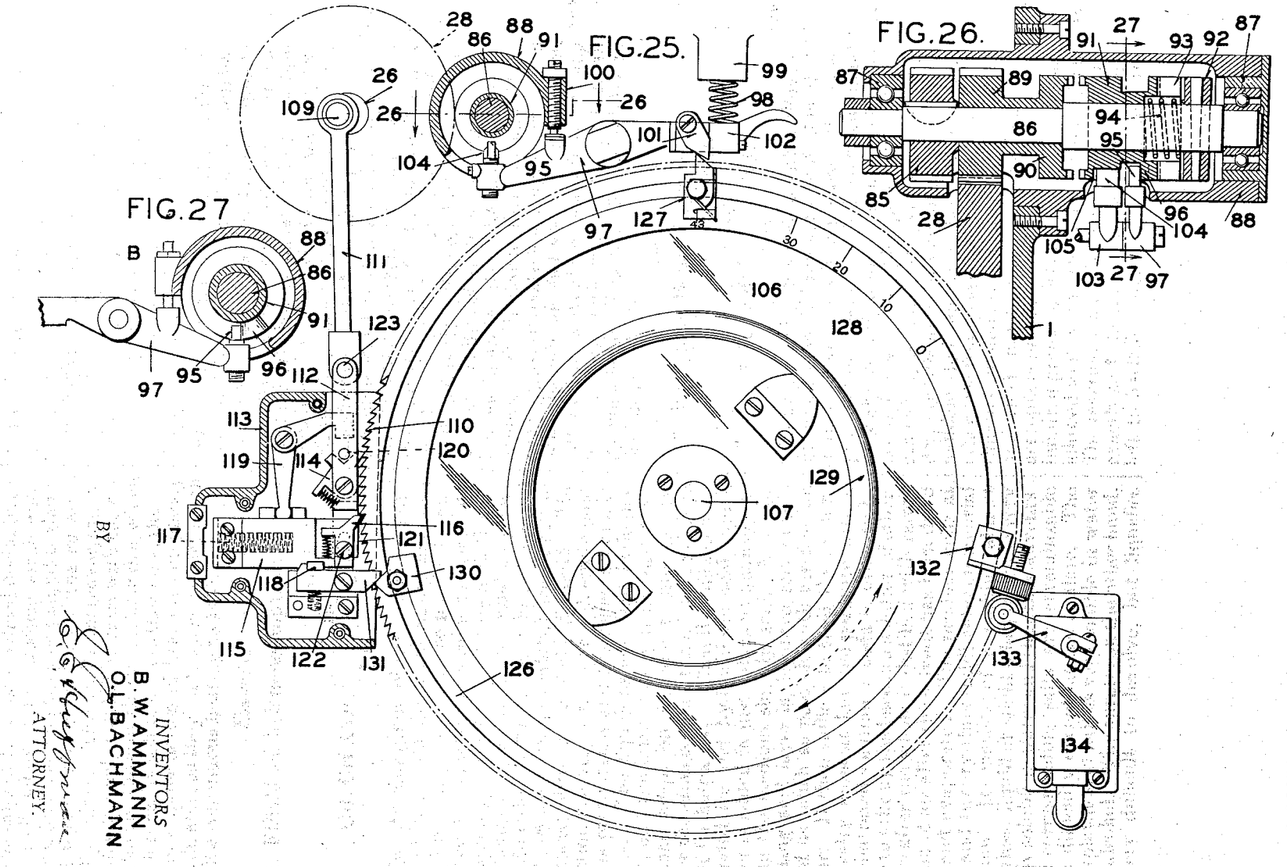
Figure 25 is an enlarged side view, partly in section, of the mechanism for determining the number of turns of wire applied to form a coil.
Figure 26 is a section taken on the line 26—26 of Figure 25.
Figure 27 is a section taken on the line 27—27 of Figure 26.

Lever 97 is actuated to control the movement of cam 71 through the clutch mechanism B by an indexing ratchet wheel 106 mounted on a stud 107 carried by the rear side wall of the main housing. The hub of this wheel is surrounded by a torsion spring 108 (Figure 21) which tends to move the indexing wheel in the direction indicated by the dotted arrow in Figure 25 and so return the wheel to zero position. The wheel is actuated from a cam 109 on the outer end of shaft 26. This cam has just sufficient movement to advance the index wheel the distance of one of the teeth 110 on its periphery. Cam 109 is connected by pitman 111 to a bar 112 slidingly mounted in a ratchet box 113 secured to the rear side wall of the main housing. Pivoted to this bar is a spring-pressed dog 114 which actuates the index wheel. In the box is a transverse slide 115 carrying a detent 116 for preventing return movement of the wheel during the downward movement of bar 112. A spring 117 tends to move slide 115 away from the wheel and thus disengage dog 116 therefrom. This movement is normally prevented by engagement of a shoulder on trip lever 131 with an abutment 118 on the slide. The slide engages with one arm of a bell-crank lever 119, the other arm of which is positioned a short distance above a pin 120 on bar 112. The distance between the horizontal arm of the bell-crank lever and pin 120 when slide 115 is in the position shown in Figure 25 is sufficient to permit the vertical movement of the pin without actuating the lever. When, however, slide 115 is moved away from the wheel, as hereinafter described, the horizontal arm will be lowered so that it will be engaged by the pin at the next stroke of the pitman to reset the slide to normal position. Bar 112 has a slotted extension 121 passing down at one side of slide 115 and engaging with the projecting end of screw 122 forming the pivot of dog 116. Thus when slide 115 is released it will swing bar 112 on its pivot 123 in order to disengage dog 114 as well as dog 116 from the ratchet wheel to permit its return to zero position. This position is determined by any suitable stop mechanism such as abutments 124 and 125, one carried on the housing wall and the other on the rear face of the gear.

Formed in the front face of the gear adjacent its toothed periphery is an annular T-slot 126 by means of which dog actuating fingers may be secured at any desired points in the circumference of the wheel. Such a finger 127 is shown in Figure 25 in position to engage dog 101 to start the clutch mechanism. While only one finger is shown for the purpose of illustration, it will be understood that as many fingers are employed as there are coils per pole to be wound on the stator. The number of ratchet teeth included between each successive pair of fingers determines the number of loops per coil which will be applied to the stator. For convenience in counting the teeth, the wheel is provided with an index scale 128, only a part of which is shown. The ratchet wheel is also provided with a hand wheel 129 to assist in the indexing operation. In addition to fingers 127, the wheel is also provided with a finger 130 for actuating the trip lever 131. This finger 130 should be so located as to engage lever 131 at the exact time that the last finger 127 engages dog 101. As it is desirable to automatically stop the motor at the completion of the last coil, the index wheel is provided with a projecting abutment 132 positioned to engage the movable arm 133 of a switch box 134 and so cut off the current to the motor at the same time that lever 131 is actuated to permit the return of the index wheel to zero. As shaft 26 carrying cam 109 is driven from the main shaft 22 at an equal speed therewith, the cam actuates dog 114 to feed the index wheel forward one tooth as each loop is applied to the stator. During this time gear 89 turns idly on shaft 86 as the clutch teeth are held out of engagement by pin 95. When, however, one of the fingers 127 engages dog 101, it will swing lever 97 on its pivot and withdraw the pin. This will permit spring 94 to engage the clutch teeth. As sleeve 91 rotates with the shaft, it will now be driven thus causing gear 85 to drive gear 84 on cam shaft 83. Gear 85 will make one complete revolution at the end of which pin 95, which has again entered the circumferential groove in the sleeve, will be in position to be engaged by cam 96. At the completion of the revolution cam 96 will engage pin 95 to disengage the clutch. As the ratio of gears 84 and 85 is four to one, a revolution of shaft 86 rotates shaft 83 through an angle of 90 degrees, thus advancing the cam disk 71 a corresponding amount. This will, through the action of cam slot 70 and roller 69, move bar 62 in the direction of the arrow (Figure 13) and increase the throw of crank-pin 57 to augment the degree of oscillation of the stator chuck. When the end of the final coil is reached, finger 130 will act on lever 131 to withdraw dogs 114 and 116 from the index wheel so that it will be returned to zero position by the tension of its spring 108. Upon the next upward stroke of pitman 111, pin 120 will operate lever 119 to return the dogs to operative position.

Carried on the end of shuttle plunger 38 is a cross head 140, shown in detail in Figure 17.

This head carries a pair of grooved rolls 141 mounted adjacent the end of the plunger. Strands of wire S are delivered to these rolls through a pair of tubes 142 in the plunger. The two strands of wire are supplied to the opposite end of the plunger from rolls 143 (Figure 1) to which they pass from rolls 144 interposed between them and stationary rolls 145. Rolls 144 are carried by toggle links 146 so that the reciprocation of the plunger does not change the tension of the wire. It will be understood that either at the point 145 or at some point beyond, the strands are controlled by some form of tension applying mechanism. Each strand of wire passes from roll 141 outwardly between a pair of rolls 188, one of which acts as a guide for the strand upon the forward movement of the shuttle and the other upon the rearward movement thereof. Rolls 188 are arranged to lie in a horizontal plane passing through the axis of the chuck.

Figure 22:
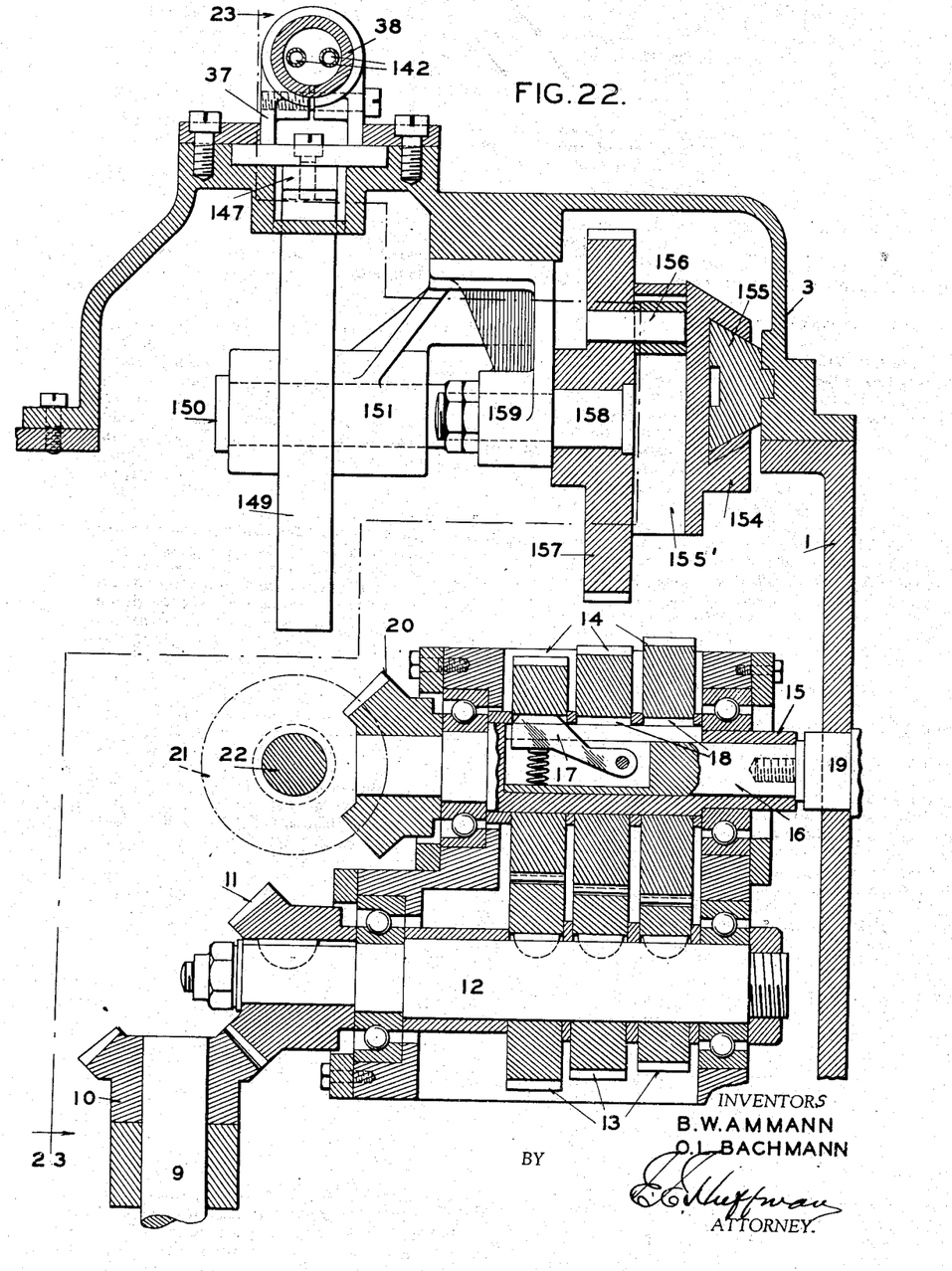
Figure 22 is a vertical transverse sectional view taken approximately on the line 22—22 of Figure 4 and showing the driving means for imparting intermittent reciprocation to the shuttle and illustrating one form of change speed gearing.
Figures 23, 24:
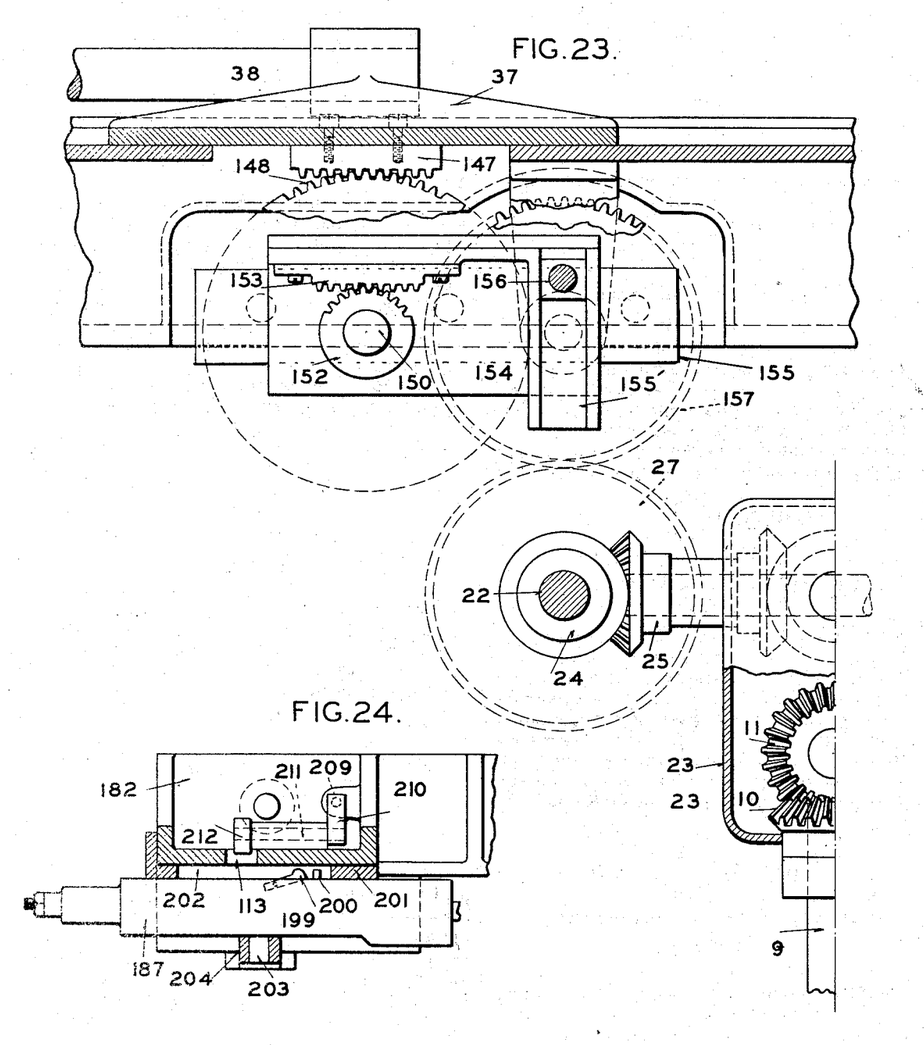
Figure 23 is a vertical longitudinal section taken on the line 23—23 of Figure 22.
Figure 24 is a detail sectional view taken on the line 24—24 of Figure 11.

Carried on the under side of the carriage 37 is a rack bar 147 meshing with segmental rack teeth 148 on a wheel or disk 149 mounted to oscillate on a shaft 150 supported in bracket 151 (Figure 22). On the opposite end of this shaft is a small gear 152 which meshes with a rack 153 mounted on the rear face of a sliding block 154 carried on a V-shaped guide 155 secured to the rear side wall of the cap 3. Formed in the rear face of block 154 is a vertical slot 155' which is engaged by a wrist pin 156 on a wheel 157 mounted on stud 158 carried in a bracket 159 secured to the top of cap 3. Gear 157 meshes with gear wheel 27 driven from the main shaft 22 at the same speed as said main shaft so that a complete forward and backward stroke will be imparted to plunger 38 at each revolution thereof.

Figure 16:
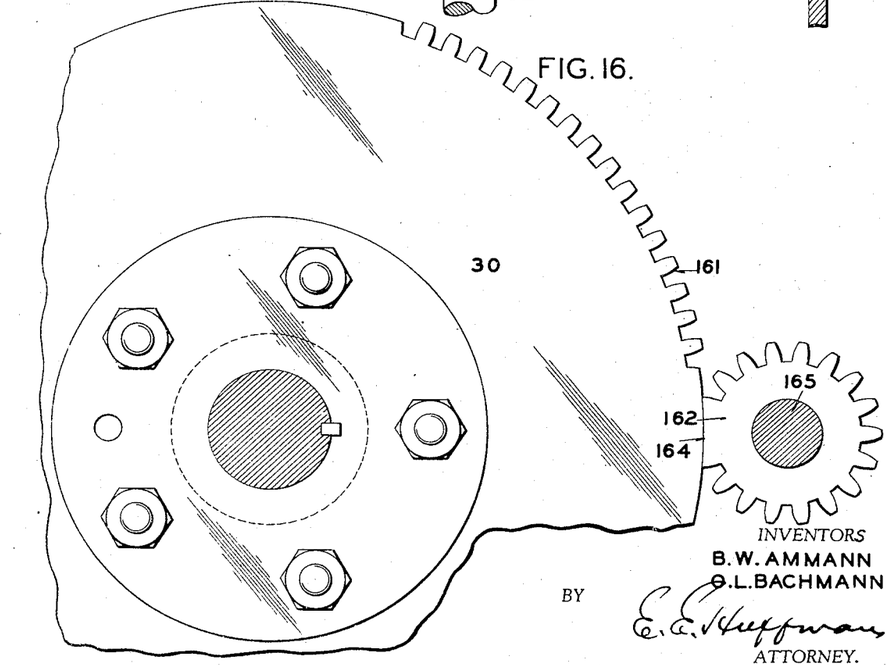
Figure 16 is an enlarged detail view of the intermittent gearing for actuating the gripping finger slides.
Figures 28, 29, 30, 31:
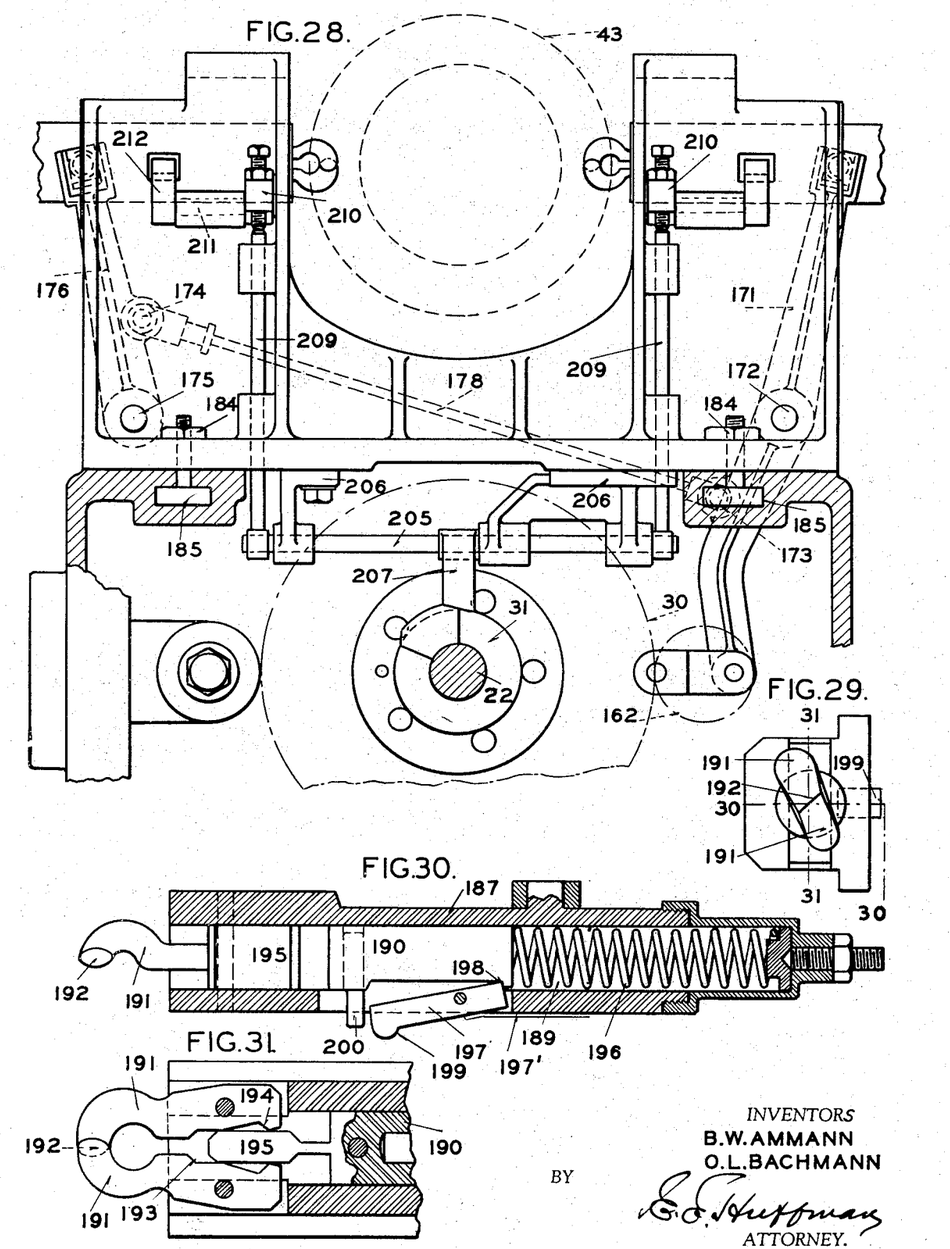
Figure 28 is a front elevation of the parts shown in Figure 11, the stator chuck being shown in dotted lines.
Figure 29 is an end view of one of the gripping finger slides, the fingers being shown in closed position.
Figure 30 is a section of the slide taken on the line 30—30 of Figure 29.
Figure 31 is a section through one end of the slide taken on the line 31—31 of Figure 29.

The mutilated gear 30 (Figure 16) is provided with teeth 161 which are just sufficient in number to impart a complete rotation to one or the other of a pair of gears 162 and 163. These latter gears operate in a manner similar to a Geneva wheel and are held against movement, except at the time of rotation, by means of concave faces 164 which contact with the smooth portion of the periphery of gear 30. Gear 162 is carried on a short shaft 165 journaled in a bracket 166 mounted on the front side wall of the main housing and gear 163 is carried on a shaft 167 journaled in a bracket 168 mounted on the rear side wall thereof. Shaft 165 is provided with a wrist pin 169 connected by a link 170 with the lower end of a finger slide operating lever 171 pivoted at point 172 to the front pedestal 33. This lever is connected by rod 173 pivoted thereto at a point 173 below its pivot 172 to a point 174 above the pivot 175 of a short lever 176 mounted on the other side of the pedestal 33. By this connection the two finger slides of the front pedestal will be simultaneously moved toward and away from each other. Shaft 167 is provided with a wrist pin 180 connected by link 181 to a second pair of levers 171' and 176', respectively, which are similar to levers 171 and 176 but are mounted on the rear pedestal 34 and are arranged in reverse position to those on the front pedestal. The upper ends of all four of these levers are slotted for engagement with the gripping finger slides, one of which is positioned at each end of each pedestal. It is to be noted that each pedestal consists of two upwardly projecting supports 182 connected by webbed base 183, best shown in Figure 4. One or both of the pedestals is secured to the main housing by bolts 184 engaging with T-slots 185 in the top of the housing so that the distance between the pedestals may be adjusted to accommodate stator cores of different thickness. Formed in each of the supports is a transverse T-slot 186 to receive a gripping finger slide 187 (Figures 18 and 30) which is flanged to prevent its lateral movement out of the slot. The slots 186 are formed in supports at such a height that the center lines of the slides will lie in the horizontal plane determined by wire guide wheels 188. The slide is provided with a cylindrical bore 189 in which slides a plunger 190. Pivoted in the end of the plunger are the shanks of a pair of gripping fingers 191. These are curved in form and rounded in cross section in order to present no sharp corners or angles to the wire with which they engage. A plane passing through these fingers will be somewhat inclined to the vertical as shown in Figure 29. The meeting end faces 192 of the fingers are inclined to the horizontal plane determined by the shuttle. This construction facilitates the release of the strands, one of which is carried above and the other below the horizontal plane by the oscillation of the chuck. It will be understood, therefore, that the inclination of the fingers and their meeting end faces will be in opposite directions in the two opposing pairs of fingers. Formed on the shank of each finger is a front cam face 193 and a rear cam face 194 which cooperate with a cam block 195 carried on the end of the plunger. When the plunger is in its forward position, as shown in Figure 19, the fingers will be opened and when it is in its rear position, as shown in Figure 31, they will be closed. A coil spring 196 biases the plunger toward the position shown in Figure 19. To retain the plunger in its retracted position, the slide has pivoted to it a detent 197, the inner end of which engages with a shoulder 198 formed in the plunger. The outer end of the lever is provided with a rounded projection 199 for engagement with releasing mechanism hereinafter described. The plunger is also provided with a projecting pin 200. Formed in the support 182 is a groove adjacent its T-slot. Positioned in this groove is a bar 201 (Figure 24) having a slot 202 for the reception of the projection 199 and pin 200. The opposite face of the slide carries a pin 203 surrounded by a bearing block 204 working in the slotted end of one of the slide operating levers.

Cooperating with each of the cams 31 and 32 are finger release connections, one for the fingers carried by the front pedestal and the other for those carried by the rear pedestal. As these connections are duplicates, only one will be described. A short rock shaft 205 is supported in brackets 206 and is provided with an arm 207 engaging with the cam. At each end of the rock shaft is a crank arm 208 on which rests the lower end of a vertical rod 209 slidingly mounted in the pedestal. The upper end of this rod contacts with an arm 210 carried on one end of a rock shaft 211 (Figure 28) journaled in a boss on the pedestal and having mounted on its other end a trip finger 212 adapted to operate through an opening 213 (Figure 24) to release the detent 199.

In adjusting the machine it is convenient to be able to rotate it by hand. To accomplish this, we mount on the motor shaft 6, a sprocket wheel 215 (Figure 1) connected by chain 216 with a wheel 217 on a shaft 218. Shaft 218 is in line with a shaft 220 mounted in a bracket 221 and carrying a hand wheel 219 (Figure 4). Shaft 220 has a fixed collar 222 between which and the bracket a coil spring 223 is interposed. This spring tends to hold a sleeve 224, pinned to shaft 220, against the bracket. The sleeve has a bore forming a bearing for the end of shaft 218. On the end of the sleeve are clutch teeth 225 for engagement with clutch teeth 226 on a collar 227 pinned to shaft 218. When it is desired to actuate the machine by hand, shaft 220 is forced rearwardly to engage clutch teeth 225 and 226 when motion may be transmitted through the motor to the machine.

The operation of our device is as follows: The two strands of wire S being led through the guide pipes 142 in the shuttle plunger are each passed around one of the grooved rolls 141 (Figure 17) and between the rolls 138, its end being attached either to stator 43 or to chuck 41 in which it is held. It will be understood that the arms of the U-shaped frame 40 stand in vertical position, as shown in Figure 11, when the chuck is in the center of its throw. In Figure 17, for convenience of illustration, we have shown the frame turned through an angle of 90 degrees from this position. In practice, however, it will never assume this extreme position as its extreme throw does not exceed 45 degrees at each side of its central position. The arms of the frame will not, therefore, interfere with the movement of the gripping fingers of the rear pedestal. Two winding horns 53 are applied to stator 43 at the center points of two opposing poles. These horns stand in horizontal position when the stator is in mid-point of its throw. The shuttle head 140 threads the two strands of wire through the stator when it is at one or the other end of its throw, in which position it is held stationary for a time by the action of Geneva gear 78. The shuttle will position the strands of wire adjacent the inner periphery of the stator, one in front of the first coil slot above one winding horn and the other in front of the first coil slot below the other horn. While the parts are in this position, the corresponding gear 162 or 163 is actuated by the mutilated gear 30 to actuate levers 171 and 176 to move the finger slides toward each other. The slides are advanced with their fingers in open position so that the fingers will embrace the strands. Just before the end of the stroke is reached, pin 200 comes in contact with the end of slot 202 causing cam block 195 to close the fingers around the wires. On the return stroke of the finger slides the wires will be carried outwardly drawing them into the stator slots and forming loops through which the ends of the winding horns pass as the chuck moves to the opposite end of its throw. After this has been reached, trip finger 212 is actuated from cam 31 through the connections heretofore described. As slide 187 is now at the outer end of its movement, detent 199 stands in front of the trip dog and is actuated by it to release the plunger and so permit spring 196 to move it into position to open the fingers and release the wire. The wire is now drawn into recess 54 of the winding horn by the movement of the shuttle. This operation is repeated at the opposite end of the stator by the other set of gripping fingers, thus applying one turn of wire to one tooth of two opposing poles. After the desired number of turns have been applied to complete the coil, finger 127 actuates the clutch mechanism shown in Figure 26 to advance cam 71 one-quarter of a turn to increase the throw of crank-pin 57 to augment the oscillation of the stator chuck.

This is accomplished in the following manner. Contact of finger 127 with dog 101 actuates lever 97 to withdraw pin 95 from the end cam 96. This permits spring 94 to move sleeve 91 to engage its teeth with those on part 90, driven from the main shaft 22 by means of bevel gears 24, 25, shaft 26, and gear 28, (see Figure 33) which gear meshes with gear 89 integral with said part 90. This rotates shaft 86 through one complete revolution. At the end of the revolution pin 95, which has returned to normal position by passage of finger 127 beyond dog 101, engages cam 96 to separate parts 90 and 91. The rotation of shaft 86, through its rigidly attached gear 85, drives gear 84. As the ratio of gears 84 to 85 is four to one, gear 84 and its shaft 83 are rotated through one fourth of a revolution. This moves cam disc 71 (Figures 10 and 21) from its first to its second position, moving bar 65 longitudinally in sleeve 26. This, through the action of miter racks 58 and 62, moves crank pin 57 farther from the center of rotation of head 59 and so increases the movement of connecting rod 56 and, consequently, the throw of the chuck. The machine will now apply turns of wire embracing three stator teeth instead of one. After all the coils have been applied to complete the two opposite poles, the index device is returned to zero position by contact of finger 130 with detent 131 and the motor is stopped by contact of abutment 132 with switch arm 133. The stator is now removed from the chuck and the winding horns detached. This is done by loosening the screws 52 and drawing the horn toward the center of the stator. The horns are now applied to the stator in a position at right-angles to their original position and the remaining poles of the stator wound in the same manner.

Having fully described our invention, what we claim as new and desire to secure by Letters Patent of the United States is:

1. In a winding machine, the combination with an oscillating work holding chuck, of a reciprocating shuttle for threading a strand of wire through the chuck, a wire engaging device positioned at each end of the chuck, each of said devices comprising a pair of curved fingers inclined to the normal plane of the loop formed by the shuttle and having abutting ends, means for opening and closing said fingers, and means for moving the devices in a direction transverse to the travel of the shuttle.

2. In a winding machine, the combination with an oscillating work holding chuck, of a reciprocating shuttle for threading a strand of wire through the chuck, a wire engaging device positioned at each end of the chuck, each of said devices comprising a pair of curved fingers having abutting end faces, said faces being inclined to the normal plane of the loop formed by the shuttle, means for opening and closing said fingers, and means for moving the devices in a direction transverse to the travel of the shuttle.

3. In a winding machine, the combination with an oscillating work holding chuck, of a reciprocating shuttle for threading a strand of wire through the chuck, a wire engaging device positioned at each end of the chuck, each of said devices comprising a pair of curved fingers inclined to the normal plane of the loop formed by the shuttle and having abutting end faces, said faces being also inclined to the normal plane of said loop, means for opening and closing the fingers, and means for moving the devices in a direction transverse to the travel of the shuttle.

4. In a winding machine, the combination with an oscillating work holding chuck, of a reciprocating shuttle for threading a strand of wire through said chuck, a wire engaging device arranged at each end of the chuck, each of said devices comprising a support, a member sliding in said support, a pair of fingers pivoted to said support and having meeting ends, a spring-actuated plunger moving in said member and provided with cam faces for actuating the fingers, a stop for moving the plunger relatively to the member in one direction, and means for releasing the plunger to permit the spring to move it relatively to the member in the other direction.

5. In a winding machine, the combination with an oscillating work holding chuck, of a reciprocating shuttle for threading a strand of wire through said chuck, a wire engaging device arranged at each end of the chuck, each of said devices comprising a support, a member sliding in said support, a pair of fingers pivoted to said support and having meeting ends, a plunger moving in said support and having cam faces for actuating the fingers, a spring biasing said plunger in one direction, a stop for compressing said spring, a detent for holding the plunger against the pressure of the spring, and cam-operated means for releasing the detent.

6. In a winding machine, a work holding chuck, means for oscillating said chuck, and an automatic control for the chuck, said control comprising a ratchet wheel moved in unison with the chuck oscillations, means for varying the arc of throw of the chuck, a clutch governing the movement of said latter named means, and an adjustable abutment on the ratchet wheel controlling the operation of the clutch.

7. In a winding machine, a work holding chuck, means for oscillating said chuck, and an automatic control for the chuck, said control comprising a ratchet wheel moved in unison with the chuck oscillations, a cam for varying the arc of throw of the chuck, a clutch governing the movement of said cam, and an adjustable abutment on the ratchet wheel controlling the operation of the clutch.

8. In a winding machine, a work holding chuck, means for oscillating said chuck, and an automatic control for the chuck, said control comprising a ratchet wheel moved in unison with the chuck oscillations, means including a miter rack device for varying the arc of throw of the chuck, a clutch governing the movement of said latter named means, and an adjustable abutment on the ratchet wheel controlling the operation of the clutch.

9. In a winding machine, a work holding chuck, driving means for oscillating said chuck through varying degrees of arc, said means comprising a connecting rod, a wrist pin driving said rod, a sliding block carrying said wrist pin, a miter rack for moving said block to vary the throw of the pin, and indexing means for controlling the movement of said rack.

10. In a winding machine, a work holding chuck, driving means for oscillating said chuck through varying degrees of arc, said means comprising a connecting rod, a wrist pin driving said rod, a sliding block carrying said wrist pin, a miter rack for moving said block to vary the throw of the pin, a cam for moving said rack, and indexing means for controlling the movement of the cam.

11. In a winding machine, a work holding chuck, driving means for oscillating said chuck through varying degrees of arc, a rotary part carrying a transversely movable block, intermittent driving means for said part, a member movable longitudinally in said part to move the block to vary the pin throw, indexing means for controlling said longitudinally movable member, and a driving connection between the pin and the chuck.

12. In a winding machine, a work holding chuck, driving means for oscillating said chuck through varying degrees of arc, said means comprising a rotary member, a block mounted to slide transversely in said member, said block carrying a wrist pin and having miter rack teeth, a rack bar movable longitudinally in said rotary member, said rack bar having miter teeth engaging with the teeth of the block, indexing means for moving the bar, and a connection between the pin and the chuck.

13. In a winding machine, a work holding chuck, driving means for oscillating said chuck through varying degrees of arc, said means comprising a rotary member, a block mounted to slide transversely in said member, said block carrying a wrist pin and having miter rack teeth, a rack bar movable longitudinally in said rotary member, said rack bar having miter teeth engaging with the teeth of the block, a cam, a push rod actuated by the cam, said push rod having a connection permitting relative rotary movement between it and the rack bar, indexing means for moving the cam, and a connection between the wrist pin and the chuck.

14. In a winding machine, the combination with an oscillating chuck, of a reciprocating shuttle for threading a strand of wire through the chuck, driving means for said shuttle including a sliding carriage, a rack carried by said carriage, a member having an arcuate rack engaging said first named rack, and means for imparting oscillating movement to said member.

15. In a winding machine, the combination with an oscillating chuck, of a reciprocating shuttle for threading a strand of wire through the chuck, driving means for said shuttle including a sliding carriage, a rack carried by said carriage, a member mounted on a rock shaft and having an arcuate rack engaging said first named rack, a second member mounted on said rock shaft and also provided with an arcuate rack, and a reciprocating rack engaging with said second named arcuate rack.

16. In a winding machine, the combination with an oscillating chuck, of a reciprocating shuttle for threading a strand of wire through the chuck, driving means for said shuttle including a sliding carriage, a rack carried by said carriage, a member mounted on a rock shaft and having an arcuate rack engaging said first named rack, a second member mounted on said rock shaft and also provided with an arcuate rack, a sliding block carrying a rack engaging with said second named arcuate rack, and a driving wheel carrying a wrist pin engaging a slot in said sliding block.

B. W. AMMANN.
O. L. BACHMANN.